L. C. STEWART.
BRAKE LINING.
APPLICATION FILED MAY 20, 1916.
1,292,530.
Patented Jan. 28, 1919.
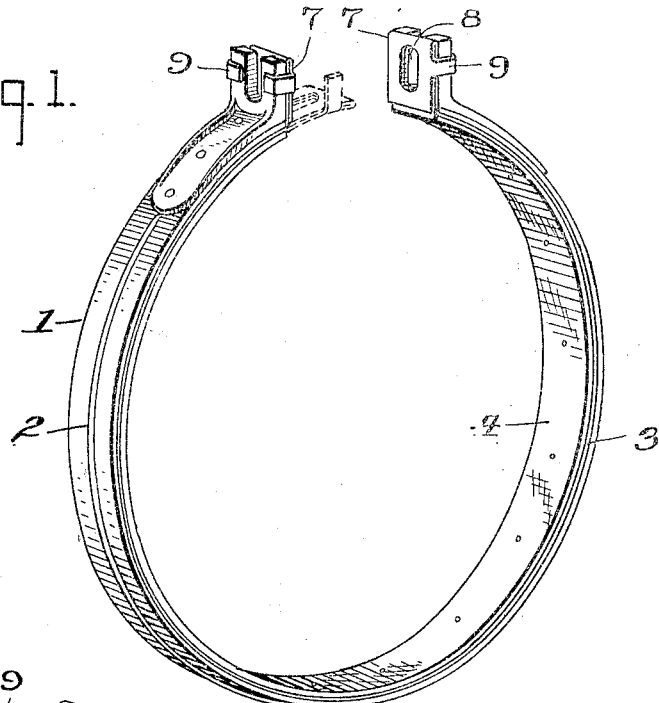
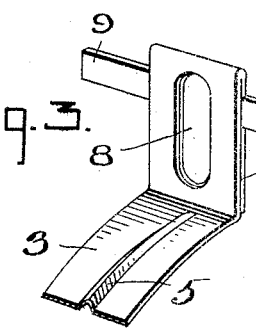
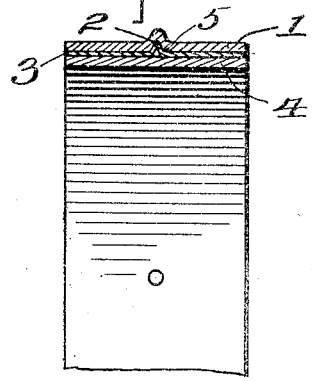
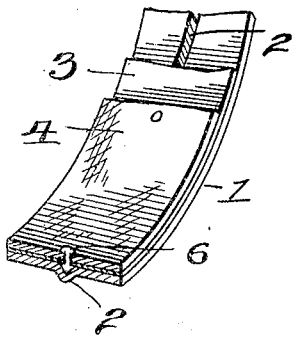

UNITED STATES PATENT OFFICE.

LYMAN C. STEWART, OF ROANOKE, VIRGINIA, ASSIGNOR OF ONE-HALF TO MARSHALL A. QUINN, OF ROANOKE, VIRGINIA.

BRAKE-LINING.

1,292,5.. Specification of Letters Patent. Patented Jan. 28, 1919.

Application filed May 20, 1916. Serial No. 98,866.

*To all whom it may concern:*

Be it known that I, LYMAN C. STEWART, a citizen of the United States, residing at Roanoke, in county of Roanoke and State of Virginia, have invented certain new and useful Improvements in Brake-Linings, of which the following is a specification.

My invention relates to an improvement in linings of brake or transmission bands, especially of the type now commonly used with the Ford automobile.

A great deal of difficulty is experienced when these linings become worn, for the reason that they are riveted fast to the brake or transmission bands. This is overcome by the present invention in the provision of a removable inner band, which carries the brake-lining, which is adapted to be slid endwise and held at its ends against the brake or transmission band end lugs.

My invention consists in a brake-lining band to which the brake-lining is riveted or otherwise secured, and slidably and detachably connected with the brake or transmission band, with its ends constructed and adapted to receive the clutch or brake pedal shaft that regularly extends through the brake or transmission band end lugs, for applying and releasing friction upon the drum.

In the accompanying drawings:—

Figure 1 is a view in perspective of the ordinary Ford type of brake or transmission band, with my improved lining applied;

Fig. 2 is an enlarged transverse cross-section; and

Figs. 3 and 4 are transverse sectional perspective views, the former showing a grooved form, and the latter showing rivets for guiding the inner band into place.

The numeral 1 represents the usual brake or transmission band, to which ordinarily the brake lining is riveted, but without any brake-lining. In my invention, this brake or transmission band has a channel 2 formed substantially throughout its length, preferably in the transverse center thereof, and formed by bending it bodily into the band, although it might be formed otherwise.

At the ends of the band 1, there are the usual upstanding open slotted lugs riveted thereon, although this, of course, constitutes no part of my present invention.

The numeral 3 is the inner flexible band, which has the brake-lining 4 riveted or otherwise secured thereto. This inner band 3 may be bent to form a ridge 5 adapted to follow the channel 2 of the outer brake or transmission band 1 in throwing the lining into place within the brake or transmission band. In lieu of this, the heads of the rivets 6, which secure the brake-lining to the inner band 3 might be fashioned to follow this channel 2, as shown in Fig. 4.

My invention also contemplates making the outer surface of the inner band 3 preferably smooth. It may not be necessary to guide the inner band laterally in taking its place as a lining of the outer brake or transmission band, as the pressure is not only always endwise thereon, but also the lining is necessarily put in place by pushing endwise, although it is perfectly obvious that some means of guiding it in place, such as the channel and rib, or channel and rivet-heads, or their equivalents, would perhaps in some instances facilitate and quicken the operation of assembling these parts.

The ends of the inner band 3, which carries the brake-lining, may be doubled over, as at 7, and provided with either an open or closed slot 8, or might have a slotted plate riveted or otherwise attached, which end in any instance is adapted to lie flat against or be bent up against the regular end lugs in position to receive the screw rock-shaft or shafts to which the clutch, brake, and reverse pedals are secured, which, when turned, apply or release friction as is well understood.

To insure holding the ends 7 in place against the lugs, the bendable side clips 9 may be provided, these preferably being made to embrace the lugs and hold the ends and lugs in tight embrace.

Obviously other more or less slight changes might be made besides those recounted herein, the essential feature being to provide an easily replaceable brake-band lining, which perhaps could be applied to any other brake of the band type, such as used in other makes of automobiles as well as in the Ford, and hence I do not mean by anything herein to limit myself strictly to the exact forms and arrangements set forth.

I claim:

1. The combination of a brake or transmission band having a channel extending lengthwise thereof, and provided with lugs at its ends, with a removable inner brake-lining band having means on its outer surface adapted to follow said channel, and means approximately at the ends for securing it to the lugs at the ends of the brake or transmission band.

2. The combination with an outer brake or transmission band, having outstanding slotted lugs at the ends adapted to receive a rock-shaft, of an inner band, a brake-lining carried thereby, said band having slotted ends adapted to lie adjacent to the lugs of the brake or transmission band, and also receive the rock-shaft.

3. An attachable liner for transmission and brake bands having a friction member to fit within the band and provided with terminal outwardly projecting elements for engagement by the band actuating means between the band lugs.

4. An attachable liner for transmission and brake bands having a friction member to fit within the band, and provided with terminal outwardly projecting ears apertured for registration with the openings in the band lugs.

5. An attachable liner for transmission and brake bands having a friction member to fit within the band, and provided with terminal outwardly projecting ears for engagement with the band actuating means between the band lugs, one of said ears being movable to a plane in alinement with the friction member.

6. An attachable liner for transmission and brake bands having a friction member to fit within the band, and provided with terminal outwardly projecting ears to engage the proximate surfaces of the band lugs, one of said ears being movable, relative to the friction member, to occupy circumferential and radial positions.

7. An attachable liner for transmission and brake bands having a friction member to fit within the band, and provided with terminal outwardly projecting ears to engage the proximate sides of the band lugs, one of said ears being pliable to permit of bending into alinement with the friction member.

8. An attachable liner for transmission and brake bands, having a friction member comprising a friction facing and a pliable backing strap, the latter being extended beyond the ends of the former to provide leaders bendable to engage the proximate faces of the band lugs.

9. An attachable liner for transmission and brake bands having a friction member comprising a friction facing and a pliable backing strap, the latter being extended beyond the ends of the former and doubled back upon itself to provide leaders bendable to engage the proximate faces of the band lugs.

10. An attachable liner for transmission and brake bands having a friction member comprising a friction facing and a pliable backing strap, the latter being extended beyond the ends of the former and reinforced to provide leaders bendable to engage the proximate faces of the band lugs.

11. An attachable liner for transmission and brake bands having a friction member comprising a friction facing and a pliable backing strap, the latter being extended beyond the ends of the former and reinforced to provide leaders bendable to engage the proximate faces of the band lugs, said leaders having apertures for registration with openings in the band lugs.

12. A lining for a friction band comprising a friction material, a member secured to said friction material having opposite ends arranged to extend beyond the said friction material and provided each with an opening adapted to receive a tool for withdrawing the said friction material from the said friction band, and means for slidably securing the lining to the friction band.

13. The combination with a friction brake member and operating means therefor, of a lining insertible along the inner surface of the friction member, and means, including the ends of the lining supported by the aforesaid operating means, for holding the lining to the said friction brake member.

14. The combination with a friction band and operating means therefor, of a lining insertible along the inner surface of the friction band, means provided on said lining for slidably engaging the friction band, and additional means including the ends of the lining adapted to be supported by the aforesaid operating means for holding the lining to the band.

15. The combination with a friction band and operating means therefor, of a lining insertible along the inner surface of the friction band, means provided on said lining for slidably engaging the friction band, and additional means for securing the lining to the band, including the ends of the lining having an opening each therein, through which a member of the aforesaid operating means passes.

In testimony whereof I affix my signature.

LYMAN C. STEWART.